(12) United States Patent
Richards

(10) Patent No.: US 6,910,987 B2
(45) Date of Patent: Jun. 28, 2005

(54) AUTOMATIC TRANSMISSION FOR LIGHT VEHICLES EMPLOYING V-TWIN ENGINES

(76) Inventor: Victor Richards, c/o API Racing Transmissions, 2276 Dixie Road, Mississauga Ontario (CA), L4Y 1Z4

( * ) Notice: Subject to any disclaimer, the term of this patent is extended or adjusted under 35 U.S.C. 154(b) by 63 days.

(21) Appl. No.: 10/687,923

(22) Filed: Oct. 20, 2003

(65) Prior Publication Data

US 2004/0132578 A1 Jul. 8, 2004

Related U.S. Application Data

(60) Provisional application No. 60/420,030, filed on Oct. 22, 2002.

(51) Int. Cl.$^7$ .............................. F16H 3/44; F16H 57/08
(52) U.S. Cl. ........................................ 475/283; 475/339
(58) Field of Search ............................. 475/282–3, 330, 475/339

(56) References Cited

U.S. PATENT DOCUMENTS

| | | | | |
|---|---|---|---|---|
| 782,547 A | * | 2/1905 | Coffee | 475/282 |
| 2,919,604 A | * | 1/1960 | De Lorean | 475/34 |
| 3,772,939 A | * | 11/1973 | Hause | 475/338 |
| 4,724,720 A | * | 2/1988 | Ohkubo | 475/44 |
| 5,951,434 A | | 9/1999 | Richards et al. | |
| 6,309,322 B1 | * | 10/2001 | Shim | 475/283 |
| 6,561,938 B1 | * | 5/2003 | Korner et al. | 475/282 |

\* cited by examiner

Primary Examiner—Roger Pang

(57) ABSTRACT

An automatic transmission is specially developed for light-vehicles driven by V-Twin engines and which utilize a separate transmission housing from the engine, and where the transmission is connected with the engine output shaft by a suitable linkage. The transmission includes a main input drive shaft oriented parallel to the engine output crankshaft, and a coaxially aligned drive output shaft. The transmission contains within a gear box a ring gear, planetary gears mounted to a planetary carrier which is mounted to the output shaft, two sun gears, a pair of clutch assemblies and two braking mechanisms. A first clutch assembly includes a clutch drive coupled to the input drive shaft, and an array of clutch plate. The second other clutch assembly is used to couple or uncouple the ring gear to the input shaft for rotation therewith. A one-way clutch is engaged through the actuation of the clutch drum to engage a first ring gear. The first ring gear in turn engages at least two and preferably four groups of idle planetary gears mounted to the planetary carrier. The idle gears in turn mesh with and rotate a first diameter end of an associated compound planetary gear also provided on the planet gear carrier, and which also mesh with the ring gear. The compound planet gears also include a second diameter portion which extend axially, so as to mesh with and engage the second other output sun gear. The brake assemblies are selectively operable to engage the second sun gear and ring gear to permit and/or prevent their relative rotation. The clutch assemblies and brake assemblies are used to enable or stop rotation of ring gear and/or planetary components to change transmission ratio or direction of rotation.

20 Claims, 8 Drawing Sheets

AUTOMATIC TRANSMISSION FOR LIGHT VEHICLES EMPLOYING V-TWIN ENGINES

RELATED APPLICATIONS

This application claims the benefit under 35 U.S.C. 119(e) to U.S. Provisional Application Ser. No. 60/420,030, filed 22 Oct. 2002.

SCOPE OF THE INVENTION

The present invention relates to an automatic transmission for motorcycles and other vehicles, and most preferably light weight vehicles which use a V-Twin engine such as motorcycles, snowmobiles, and other all terrain vehicles.

BACKGROUND OF THE INVENTION

The use of a transmission is required in most vehicles which are powered by combustion engines. Conventional automatic transmissions are not usable on motorcycles and other light vehicles as a result of their typically large size and shape. In particular motorcycle drive systems require a light weight and compact construction with specific mounting arrangement. Although various automatic transmissions for motorcycles are known, as a result of sizing restrictions, heretofore conventional transmissions are provided with a reduced number of forward gears to enable the transmission to be made sufficiently small to permit their mounting on the motorcycle frame.

SUMMARY OF THE INVENTION

The present invention seeks to overcome the disadvantages of prior art drive systems by providing a specific arrangement of transmission components for motorcycle and other light vehicle applications.

Another object of the invention is to provide a transmission having a two stage planetary gear, and which provides three forward operating speeds and one reverse speed.

A further object of the invention is to provide a transmission having a reverse speed to facilitate vehicle handling while parking, and which most preferably is operated by manual push-button which, for example, maybe mounted on the steering bar.

Another object of the invention is to provide a transmission construction which incorporates a lock up converter for improved efficiency.

To at least partially achieve some of the aforementioned objects, the present invention provides an automatic transmission which, although not restricted in use, is specially developed for light-vehicles, such as two-wheel motorcycles, ATV's, snowmobiles and the like, and most preferably light vehicles which are driven by V-Twin engines. Furthermore, the transmission is most particularly suitable for light vehicle drive systems which utilize a separate transmission housing from the engine, and where the transmission is connected with the engine output shaft by chain, timing belt, or other suitable linkage. The arrangement of the transmission advantageously facilitates retrofitting existing standard transmissions by the hereinafter disclosed automatic transmission, and provides a compact design and gearing arrangement.

The transmission includes a main input drive shaft which in a most simplified construction is oriented parallel to the engine output crankshaft, and a drive output shaft. Both the engine output shaft and transmission input shaft may be connected by a suitable linkage, and most preferably by a primary synchronous belt and a torque converter. The transmission contains, planetary gears mounted to a planetary carrier, two sun gears, a clutch assembly and two braking mechanisms, all of which are mounted within a gearbox or housing. In a preferred motorcycle construction, the automatic transmission has a cylindrically shape housing which is traversly mounted, and located behind the engine.

The input shaft is preferably made from alloy metals such as steel, which is hardened and tempered with the outside diameter of the input shaft, ground to close tolerances to obtain close fit with the torque converter. The torque converter which may be mounted inside of a driven synchronous sprocket and attached to starter ring gear. The torque converter is used to transmit power from the primary synchronous belt to the input drive shaft, and preferably is used to continuously rotate the input drive shaft in forward rotational movement while the engine is running.

The output shaft is preferably also formed from alloy metals, such as hardened and tempered steel. The output shaft is ground to close tolerances at its outside dimensions, and is secured by means of a spline, weldment, or other suitable connecter to the planet carrier within the gearbox. The output shaft is provided with a sprocket or other suitable drive member, outside of the transmission housing and a synchronous, belt chain or other linkage is used to drive one or more wheels of the vehicle. The sprocket engages the chain or belt movement used to drive the rear wheel of the vehicle.

The clutch assembly preferably includes a first clutch drive assembly, a second ring gear assembly, and a one-way clutch. The first clutch drum assembly includes, a clutch drum which is welded, splined, or otherwise connected to the input drive shaft for rotation therewith, an actuator piston, and one or more arrays of clutch plates which when engaged, couple the clutch drum to an inner end of the output shaft.

The second ring gear assembly includes a ring gear which is provided radially about and spaced from the input shaft, an actuator piston and one or more clutch plate arrays used to couple the ring gear to the first clutch drum. The ring gear is made from high strength metal alloy, such as steel, machined with cut internal gear teeth disposed in the housing. When assembled, the ring gear teeth engage with one or more planet gears. The ring gear is furthermore engageable by at least one of the arrays of clutch plate. In a simplified construction clutch plates could for example, consist of sets of 3, 4, 5 or more (internal and external) clutch plates which are used to connect or disconnect two rotating members at operating speed.

The one-way clutch is engaged by the input shaft to rotate the first sun gear in forward rotational movement while the input shaft is rotated forward at faster speeds than the speed of rotation of the output shaft. At least two and preferably four groups of the planetary gears and associated compound planetary gears are provided on the planet gear carrier in order to reduce load to gear teeth. In a preferred construction, the first input sun gear is engaged by first stage idle planetary gears. The first stage idle planetary gears are in turn further engaged by a respective first portion of an associated second stage compound planetary gear. The first portion of the compound planetary gears also mesh with and engage the ring gear. The compound planet gears also include a second other portion which extend axially, so as to mesh with and engage the second other output planetary sun gear. This arrangement allows reduction of transmission size and weight.

The brake assemblies are selectively operable to engage the ring gear and/or output sun gear, so as to permit or prevent their rotation relative to the housing. Various possible constructions of brake assemblies are envisioned for use in the present invention. In one simplified construction, the brake assemblies may consist of band brakes made of conventional stock components. Although not essential, the braking mechanisms are preferably operated by hydraulic actuator located in an oil pan, extended from or in fluid communication with the main transmission housing. As will be described, the brakes stop rotation of planetary components to change transmission ratio or direction of rotation.

In a preferred construction, the transmission has five modes of operation, including: neutral; first gear; second gear; third gear or direct drive with locked up converter; and a reverse gear. Individual operation modes are most preferably selected by programmable electronic controller (PLC) based on driver activation and vehicle operation mode. It is envisioned, however, that other types of controls, including mechanical and/or electromechanical controls could also be used. In one simplified construction, the PLC sends an electrical signal to one or two of four electromagnetically operated hydraulic valves controlling actuating clutches and/or band brakes within the transmission to selectively couple and/or uncouple the ring gear and sun gears from the transmission input and output shafts.

Accordingly, in one aspect the present invention resides in a transmission comprising: an input drive shaft, the input drive shaft being elongated along and rotatable about an axis, an elongated output shaft, the output shaft being rotatable about and coaxial with the axis, an input sun gear being selectively rotatable about the axis, a one-way clutch coupled to the input shaft for rotation therewith selectively engaging the input sun gear, the one-way clutch operable to engage and rotate the input sun gear in forward rotation about the axis when the input drive shaft is rotated about the axis at a faster forward rate that the output drive shaft, an output sun gear spaced axially from the input sun gear, the output sun gear being selectively rotatable about the axis, an output gear brake assembly selectively operable to permit or prevent rotation of the output sun gear radially about the axis, a first clutch assembly including, a first clutch drum assembly including a first selectively actuable clutch piston coupled to the input shaft for rotation therewith, and a first clutch plate array activatable by said first clutch piston to couple the first drum assembly and said output drive shaft, a second clutch assembly including, an annular ring gear having an annularly extending toothed ring gear surface extending radially about and spaced from the axis, a second selectively actuable clutch piston coupled to the ring gear for rotation therewith, a second clutch plate array activatable by said second clutch piston to couple the ring gear to the first drum assembly for rotation therewith, a ring gear brake assembly selectively operable to permit or prevent rotation of the ring gear, a planetary gear assembly comprising: a planet gear carrier fixed to said output shaft for rotation therewith, a first set of planetary gears rotatably mounted on said planet gear carrier and meshing with a portion of said input sun gear, and a second set of compound planet gears rotatably mounted on said planet gear carrier, each second compound gear comprising: a first diameter portion and a second diameter portion spaced axially from the first diameter portion, the first diameter portion interposed between and meshing with an associated one of said first planetary gears and said toothed ring gear surface, the second diameter portion meshing with said output sun gear.

Preferably, the second diameter portion of each compound planetary gear has a diameter selected greater than a diameter of the first diameter portion.

More preferably, the input sun gear has a diameter and a number of radially extending gear teeth which is selected less than that of the output sun gear. Although not essential, the input planetary gears preferably have a diameter and number of radially extending gear teeth selected substantial equal to the diameter portion of the associated compound planetary gear.

In another aspect, the present invention resides in a light vehicle drive assembly comprising: a vehicle engine having an engine output shaft, a transmission comprising, a transmission housing having an opening extending axially therethrough, an elongated input drive shaft and output drive shaft being coaxially aligned in said opening, each of the input drive shaft and output drive shaft being elongated along and rotatable about the axis, a linkage rotatably coupling the engine output shaft and the input shaft, an input sun gear being selectively rotatable about the axis, a one-way clutch coupled to the input shaft for rotation therewith, the one-way clutch engaging and rotating the input sun gear in forward rotation about the axis only when the input drive shaft is rotated about the axis at a faster forward rate than the output drive shaft, an output sun gear disposed about the axis and being selectively rotatable about the axis, an output gear brake assembly selectively engageable with the output sun gear to permit or prevent rotation of the output sun gear relative to said housing, a first clutch assembly including, a first clutch drum assembly including a clutch drum coupled to the input shaft for rotation therewith, a first selectively actuable clutch piston mounted to said first clutch drum, and a first clutch plate array activatable by said first clutch piston to rotatably couple the first drum assembly and said output drive shaft, a second clutch assembly including, an annular ring gear having an annularly extending toothed ring gear surface extending radially about and spaced from the axis, a second selectively actuable clutch piston coupled to the ring gear for rotation therewith, and a second clutch plate array activatable by said second clutch piston to couple the ring gear to the first drum assembly for rotation therewith, a ring gear brake assembly selectively operable to permit or prevent rotation of the ring gear relative to said housing, a planetary gear assembly comprising, a first set of planetary gears rotatably mounted on said planet gear carrier and meshing with a portion of said input sun gear, and a second set of compound planet gears rotatably mounted on said planet gear carrier, each second compound gear comprising, a first diameter portion and a second diameter portion spaced axially from the first diameter portion, the first diameter portion interposed between and meshing with an associated one of said first planetary gears and said toothed ring gear surface, the second diameter portion meshing with said output sun gear.

In a further aspect, the present invention resides in a transmission comprising: a transmission housing having an elongated opening extending along an axis therethrough, an elongated input drive shaft rotatably disposed in said opening, an output drive shaft being coaxially aligned, an input sun gear disposed radially about the axis and being selectively rotatable, a one-way clutch coupled to the input shaft for rotation therewith, the one-way clutch engaging and rotating the input sun gear in forward rotation about the axis only when the input drive shaft is rotated about the axis at a faster forward rate than the output drive shaft, an output sun gear disposed radially about the output shaft and being selectively rotatable about the axis, an output gear brake assembly selectively engageable with the output sun gear to permit or prevent rotation of the output sun gear relative to said housing, a first clutch assembly including, a first clutch drum assembly including a clutch drum coupled to the input shaft for rotation therewith, a first selectively actuable clutch piston mounted to said first clutch drum assembly, a first clutch plate array activatable by said first clutch piston to rotatably couple the first drum assembly and said output drive shaft, a second clutch assembly including, an annular ring gear having an annularly extending gear surface extending radially about and spaced from the axis, a second selectively actuable clutch piston coupled to the ring gear for rotation therewith, and a second clutch plate array activatable by said second clutch piston to couple the ring gear to the first clutch drum for rotation therewith, a ring gear brake assembly selectively operable to permit or prevent rotation of the ring gear relative to said housing, a planetary gear assembly comprising, a planet gear carrier fixed to said output shaft for rotation therewith, a first set of planetary gears rotatably mounted on said planet gear carrier and meshing with a portion of said input sun gear, and a second set of compound planet gears rotatably mounted on said planet gear carrier, each second compound gear comprising, a first diameter portion and a second diameter portion spaced axially from the first diameter portion, the first diameter portion interposed between and meshing with an associated one of said first planetary gears and said toothed ring gear surface, the second diameter portion meshing with said output sun gear.

In another aspect, the present invention resides in a vehicle drive system comprising: an axially elongated motor drive shaft, and a transmission have an input shaft rotatably coupled to the drive shaft and a coaxially aligned output shaft for providing power output to a vehicle wheel, said transmission further comprising: a first annular ring gear extending radially about the input shaft and having a first diameter, a radially extending input sun gear disposed about said axis, an output drive sun gear rotatably disposed about at least part of the output drive shaft, a planetary gear carrier coupled to the output shaft for rotation therewith and a first portion with, a first set of idle planet gears meshing with the input sun gear, and a second set of compound gears, each of the compound planet gears including a first portion with the ring gear and meshing with and interposed between an associated idle gear and ring gear, and a second portion extending axially and meshing with the output sun gear, the ring gear and driven sun gear being selectively rotatable about said axis, a respective brake assembly selectively operable to lock the ring gear and/or driven sun gear, and a one-way sprag assembly operable to rotatably engage the input sun gear when the input shaft is rotated at forward speeds faster than the forward rotational speed of the output shaft, and wherein the first and second portions of the compound planetary gears each carry a plurality of gear teeth, and whereby the number of gear teeth on the first portion is less than the number of teeth on the second portion.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
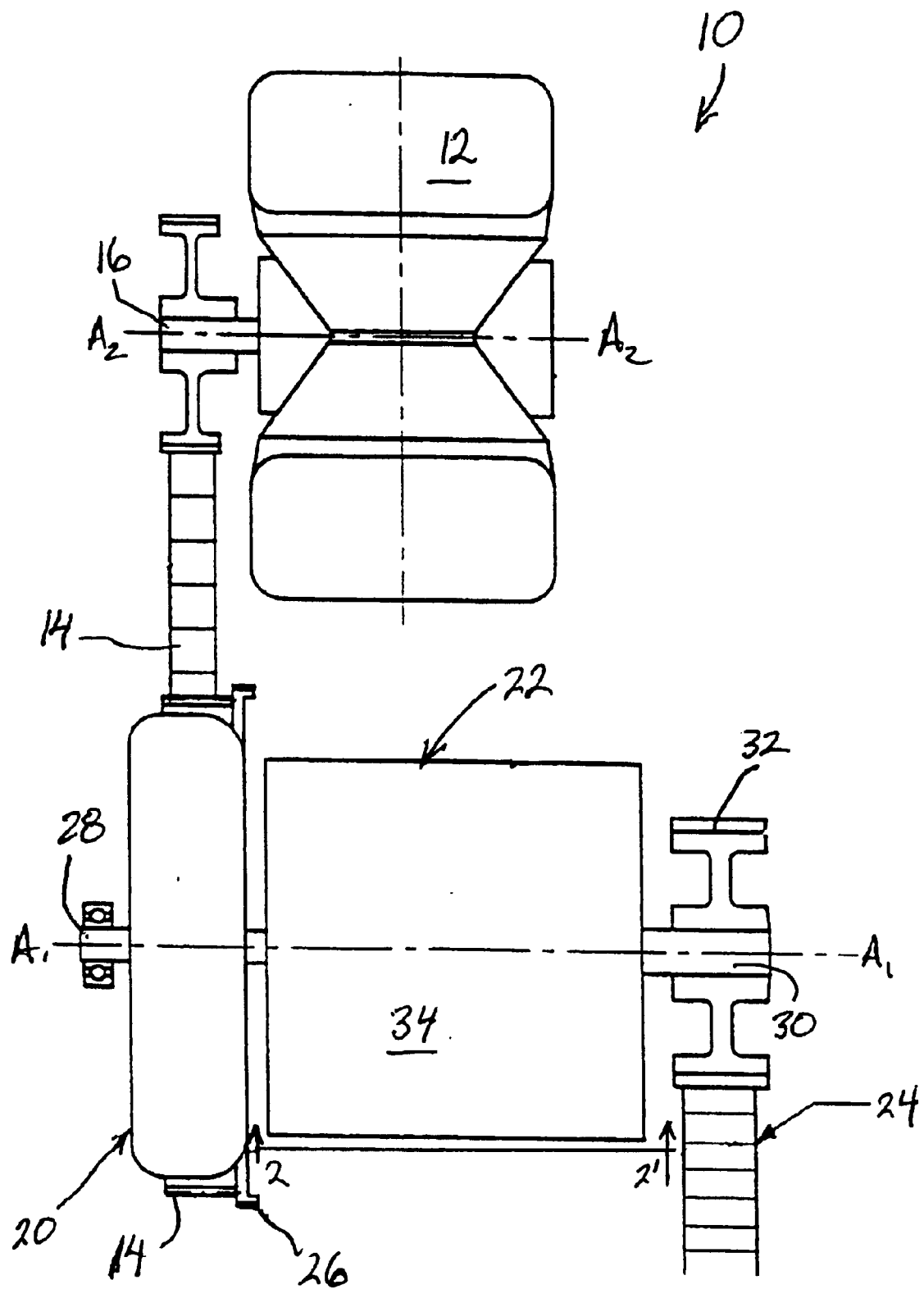
FIG. 1 illustrates schematically a motorcycle drive system incorporating an automatic transmission assembly in accordance with a preferred embodiment of the invention.

Reference may be had to FIG. 1 which illustrates schematically a drive system 10 for a motorcycle or other light vehicles. The drive system 10 includes a V-twin engine 12 having an axially elongated engine output shaft 16, a primary drive belt 14 and torque converter 20 used to transmit power from the engine output shaft 16 to a transmission assembly 22, and a secondary drive belt 24 for use in driving the rear motorcycle wheel (not shown). As shown best in FIG. 1, the engine output shaft 16 is used to drive the primary drive belt 14. The belt 14 in turn is used to rotatably engage the torque converter 20 which turns a turbine or other suitable linkage member (not shown) used to turn the transmission input shaft 28. A starter ring gear 26, when engaged with a starter motor, is used to start the motor 12.

As will be described, the transmission output shaft 30 is used to output power from the transmission assembly 22 to the rear wheel, and is provided with a drive sprocket 32 (FIG. 1) used to engage the secondary drive belt 24 in movement.

Figure 2:
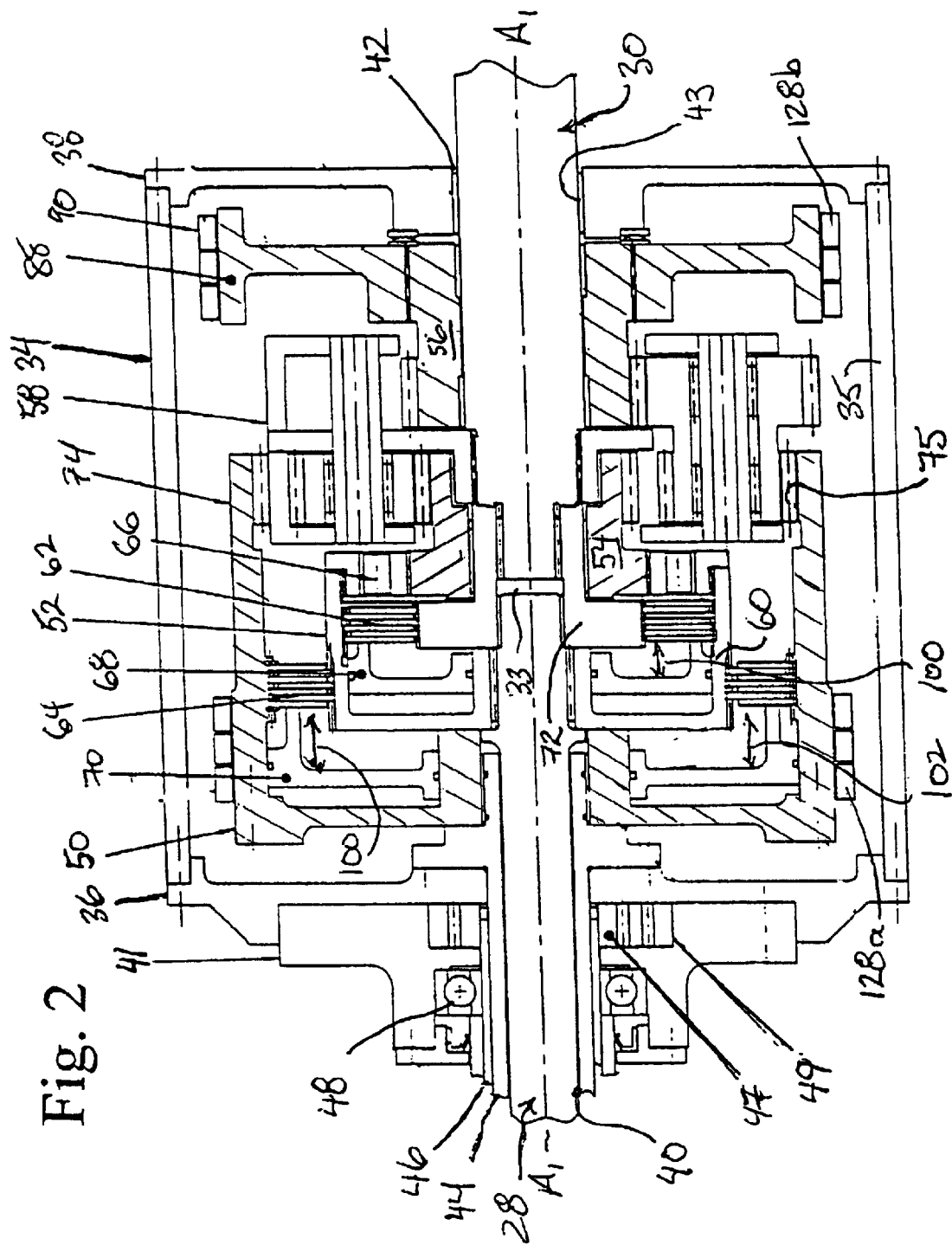
FIG. 2 illustrates a schematic cross-sectional view of the transmission assembly shown in FIG. 1, taken along line 2–2'.

The gearing for the automatic transmission assembly 22 is housed within a generally cylindrical housing 34. The housing 34 provides an outer shell for the main components of the automatic transmission 22. The housing 34 preferably is formed as a compact generally cylindrical shape. The housing 34 includes an elongated opening which extends therethrough along an axis $A$-$A_1$, which in motorcycle applications most preferably is oriented parallel to and rearwardly from the axis of elongation ($A_2$-$A_2$) of engine output shaft 16 (FIG. 1). FIG. 2 shows best the transmission assembly 22 as including the input drive shaft 28 and an output shaft 30. The input drive shaft 28 is coupled to the torque converter 20 used to translate power from the primary drive belt 14 to the transmission assembly 22 and rotate the input shaft 28 in a forward direction about the axis $A_1$-$A_1$. The bottom of the housing 34 is provided with an oil pan 35 which may be made from suitable metals, such as aluminium, magnesium, or aluminium casting. The oil pan 35 is preferably made of aluminium sheet metal and is attached to the main housing 34 by bolts (not shown). As will be discussed, the oil pan 35 provides a reservoir for hydraulic oil used in operation of the automatic transmission assembly 22. The ends of the housing 34 are sealed about the input and output shafts 28,30 by end covers 36,38 which most preferably, are formed from machined aluminium and include, respectively, axially positioned openings 40,42. A bearing 43 is provided in the output opening 42 to align the output shaft 30 in position along the centre axis $A_1$-$A_1$ of the transmission 22.

The drive input shaft 28 and output shaft 30 are most preferably provided as elongated cylindrical hardened steel members provided in a coaxially aligned orientation with each other and with the housing axis $A_1$-$A_1$, and extend inwardly therein through a respective opening 40,42. A trust bearing 33 separates the adjacent ends of the input and output shafts 28,30 enabling this operation at different rotational speeds. The trust bearing 33 is most preferably selected from commercial stock.

As shown best in FIG. 2, the opening 40 formed in the input side end cover 36 extends axially through an end mounted oil pump housing 41. The opening 40 is sized thereto to receive therein a hollow stator shaft 44. The stator shaft 44 is provided with a hollow interior adapted to receive therein in coaxially alignment input shaft 28. An oil pump drive shaft 46 is provided as a hollow shaft which is disposed radially about the stationary shaft 44 and is rotatably supported by pump drive shaft bearings 48. The oil pump drive shaft 46 is attached to the torque converter 20, so as to provide constant rotation therewith to hydraulic pump gears 47,49 which are coupled to the pump drive shaft 46. The pump gears 47,49 are disposed within the pump housing 41 for providing and porting pressurized oil from the oil pump housing 41 to or from transmission housing 34 and torque converter 20.

Within the housing 34, the transmission assembly 22 further includes a second gear clutch housing assembly 50, a forward drum clutch assembly 52, an input drive sun gear 54, an output sun gear 56, a planetary gear assembly 58 and a one-way sprag clutch assembly 66. FIG. 2 shows best the forward drum clutch assembly 52 as including a clutch drum assembly 60 coupled to the input shaft 28 by splines for constant rotation therewith and an array of clutch plates 62 selectively actuable to couple the clutch drum assembly to the inner end of the output shaft 30. The clutch drum assembly 60 is further provided an axially slidable actuator pistons 68 which is moveable to engage the clutch plate array 62.

FIG. 2 shows the second gear clutch housing assembly 50 as including a second array of clutch plates 64, an axially slidable actuator piston 70, and a ring gear 74 which extends radially about the axis $A_1$-$A_1$. The ring gear 74 extends axially within the cylindrical housing 34 and is preferably disposed radially about the innermost end of the input shaft 28. The radially inwardly created surface of the ring gear 74 is provided with gear teeth 75 which, as will be described, are engaged by the planetary gear assembly 58.

The hydraulic actuator pistons 68,70 are selectively moveable in the axially orientation, whereby pressure from hydraulic oil pumped or released into or out of the pump housing 41 is used to selectively move the pistons 68,70 in the direction of arrows 100,102, into engagement against the respective arrays of clutch plates 62,64, to selectively actuate each array 62,64.

The outer array of clutch plates 64 is selectively co-operable with the clutch drum ring gear 74 in the operation of the transmission assembly 22. The inner array clutch plates 62 co-operable with the innermost end of the output shaft 30. Optionally, a clutch hub 72 may be secured to the inner end of the output shaft 30, to facilitate engagement of the clutch plate array 62. Each of the arrays of clutch plates 62,64 preferably consists of five internal and external nested clutch plates which are used to connect or disconnect the operating speeds. The individual clutch plates in the arrays 62,64 may be made from a number of conventional materials, and for example, could include a combination of steel and fiber filled plates which are stamped and heat treated to higher hardness.

The one-way sprag clutch assembly 66 is mechanically locked to the input drive sun gear 54 by the forward rotational force of the forward drum clutch assembly 52 as it rotates with the input drive shaft 28. The one-way sprag clutch assembly 66 is selected so as to engage and rotate the input sun gear 54 about the axis $A_1$-$A_1$ preferably only while the input shaft 28 rotates in a forward direction, about the axis $A_1$-$A_1$, faster than the output shaft 30. In this manner, the sprag clutch assembly 66 is used to selectively lockup the input sun gear 54 for forward rotation with the rotation of the input shaft 28.

Figure 3:
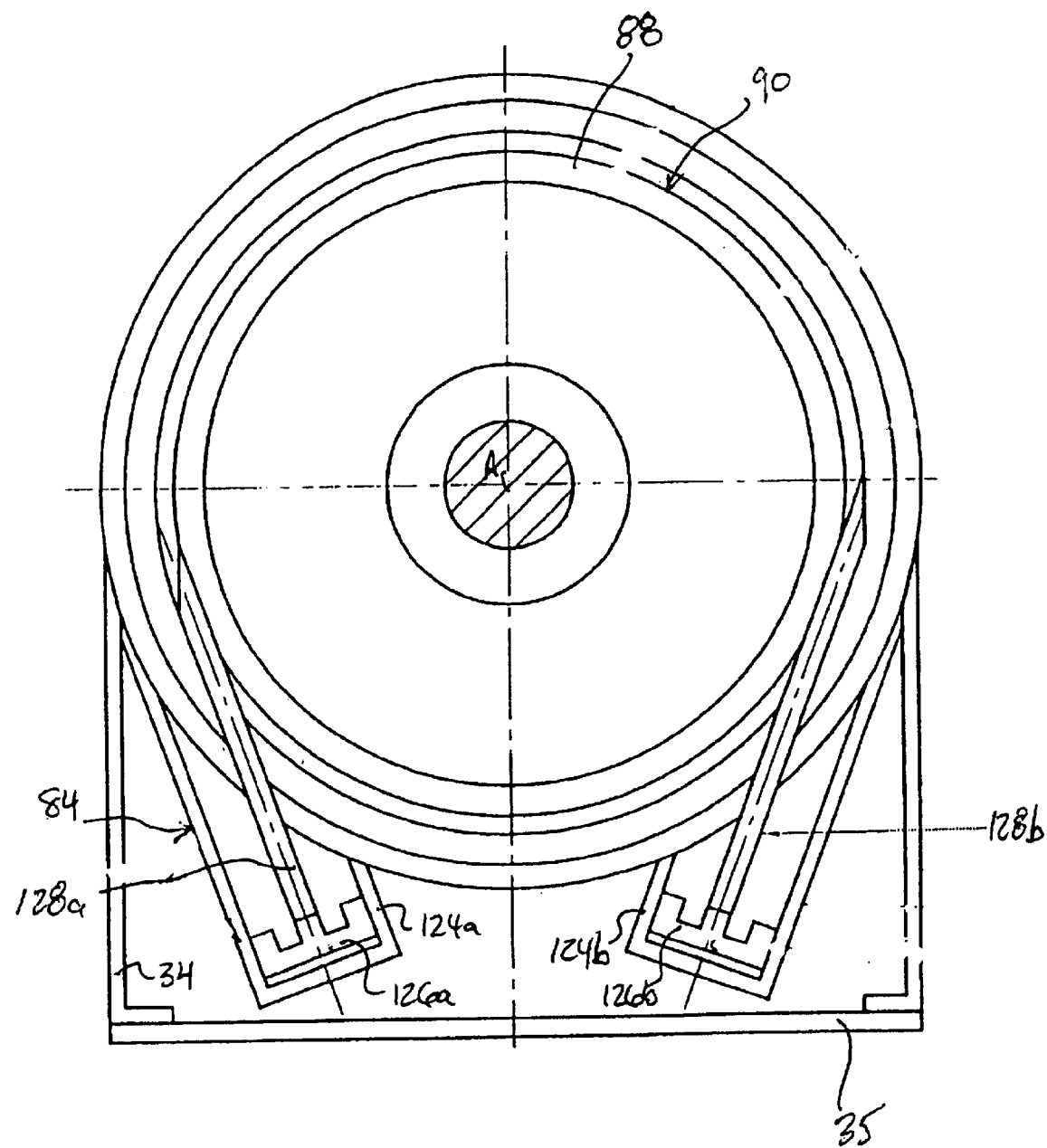
FIG. 3 illustrates a cross-sectional view of the brake band assembly used in transmission assembly shown in FIG. 2.

The ring gear 74 is selectively coupled and/or uncoupled in rotational movement about the axis $A_1$-$A_1$, together with the input shaft 28 by the selective operation of clutch plate array 64 and/or a brake band assembly 84 (FIG. 3). As will be described, the brake band assembly 84 includes a brake band 128a which, in operation, is used to engage a peripheral portion of the ring gear 74 and prevent its rotation relative to the housing 34. Similarly, the activation of the actuator piston 70 is used to engage and actuate the clutch plate array 64, to lockup the ring gear 74 with the forward drum clutch assembly 52 for rotation together with the input shaft 28.

Figure 4:
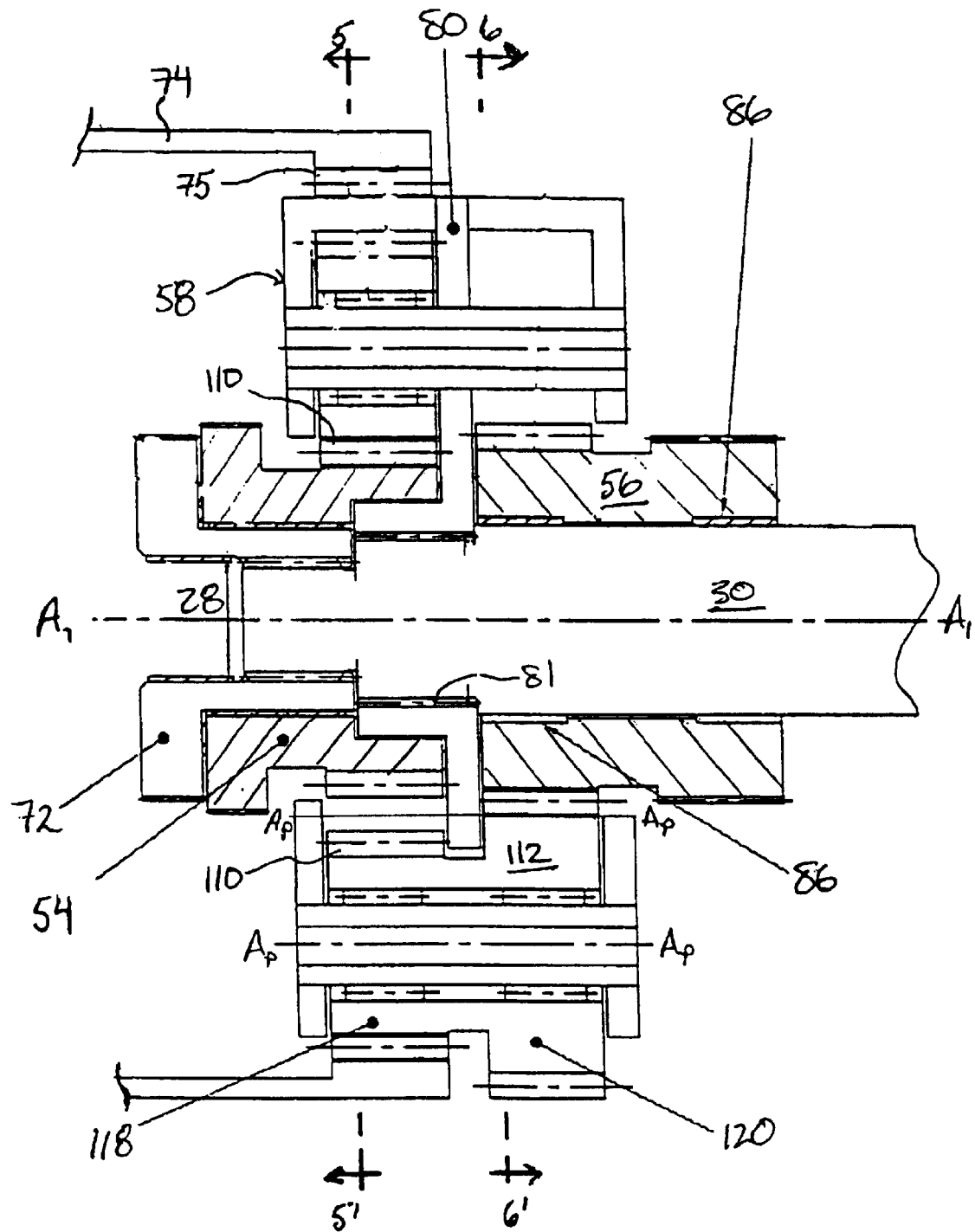
FIG. 4 illustrates an enlarged partial cross-sectional view of the planetary gear assembly used in the transmission assembly show in FIG. 2.
Figure 5:
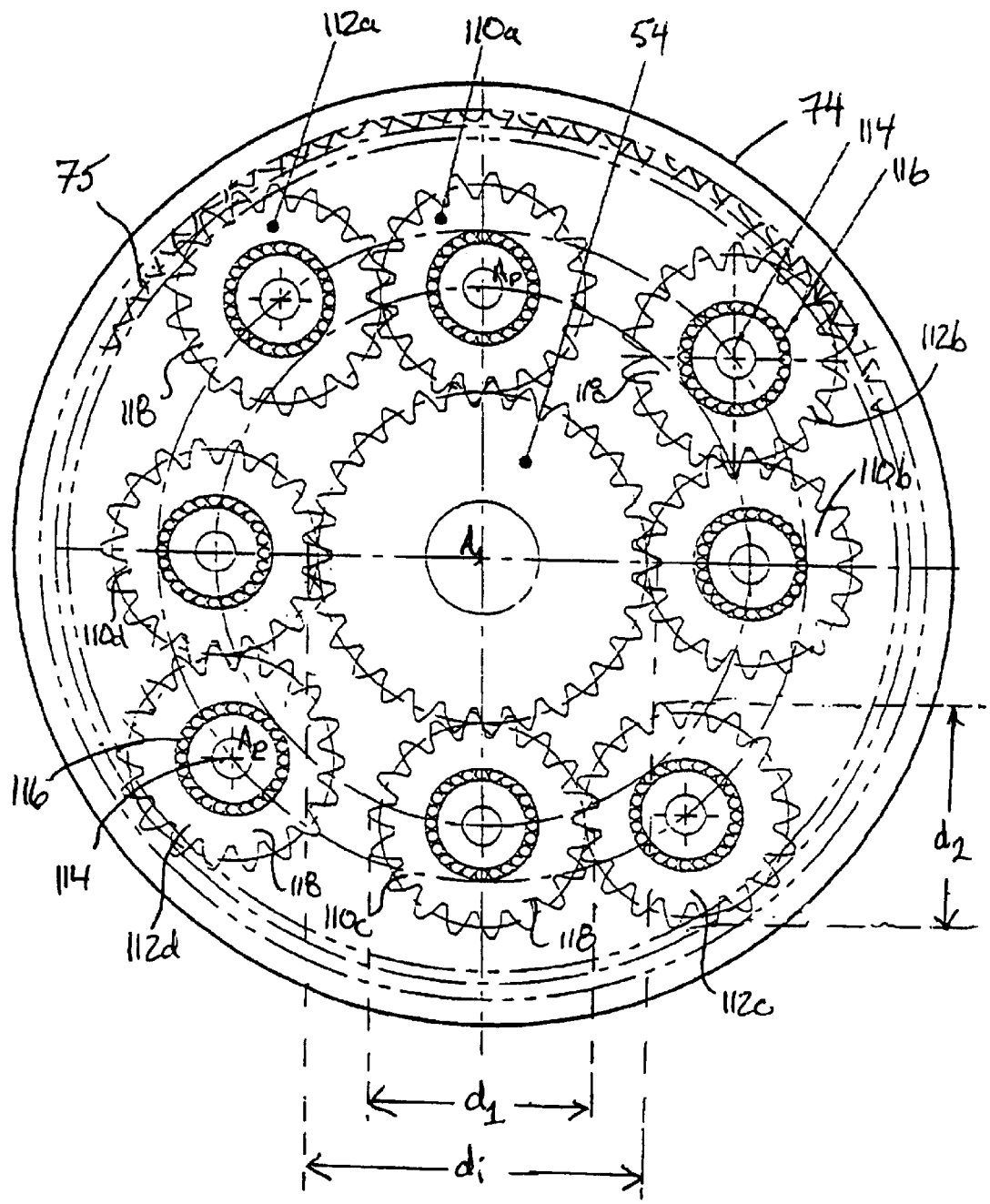
FIG. 5 illustrates a cross-sectional end view of the first stage idle planetary gears of the planetary gear assembly shown in FIG. 4, taken along 5–5'.
Figure 6:
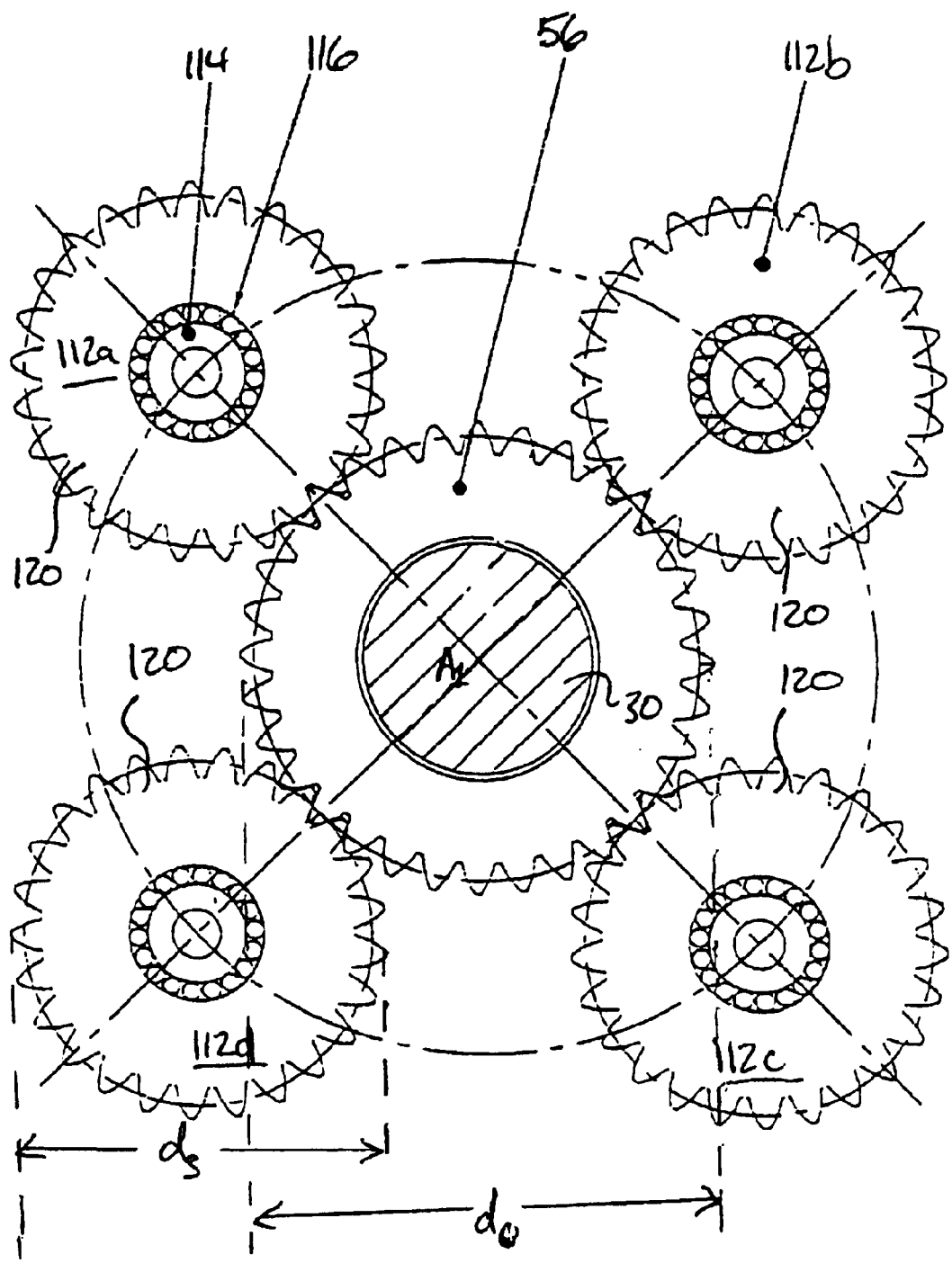
FIG. 6 illustrates a sectional end view of the second stage planetary gears of the planetary gear assembly shown in FIG. 4, taken along 6–6'.

FIGS. 4 to 6 show best enlarged views of the planetary gear assembly 58 used in the transmission assembly 22 of FIG. 2. The planetary gear assembly 58 is mounted for radially movement in a plane normal to and about the axis $A_1$-$A_1$ and includes a planet gear carrier 80 (FIG. 4) used to mount first stage idle gears 110 and second stage compound planet gears 112. Most preferably, the planet gear carrier 80 is formed from a high strength alloy steel and may, for example, consist of a welded multiple piece construction which is machined and jig-bored to provide accurate location of the individual planetary gears 110,112. As shown best in FIG. 4, the planetary gear carrier 80 is secured by splines 81 to the inner end of the output shaft 30. As will be described, the carrier 80 acts in concert with the driven or input sun gear 54 and the output sun gear 56 to transmit rotational power from the input shaft 28 to the output shaft 30.

The output sun gear 56 is mounted for relative rotation about the output shaft 30, and is secured in rotatable alignment with the axis A-$A_1$ therewith by a series of plane bearings 86. Preferably, the output sun gear 56 has a radial diameter $d_o$ and number of peripherally extending gear teeth greater than the radial diameter $d_i$ and number of peripheral gear teeth of the input sun gear 54.

FIGS. 5 and 6 illustrate best the planet gear carrier 80 as mounting four first stage idle planet gears 110a, 110b, 110c and 110d, and four second compound planet gears 112a, 112b, 112c and 112d. In a preferred construction, the planet gear carrier 80 has two compartments; one for housing the first stage planet gears 110, and the other for housing the second stage compound planet gears 112. Each of the planet gears 110a, 110b, 110c, 110d, 112a, 112b, 112c, 112d are rotatably mounted on a respective axially positional pin shaft 114 and roller bearings 116. The pin shafts 114 are most preferably made from bearing tool steel and have been heat treated to high hardness sufficiently to withstand abrasion with the roller bearings 116. The pin shafts 114 are formed as generally cylindrical pins which are elongated along a respective pin axis $A_p$-$A_p$ (FIG. 4) which in assembly, is parallel to the axis $A_1$-$A_1$. The pin shafts 114 may be pressed fitted on to the planet gear carrier 80 and secured by either button head screws (not shown), by stamping, or the like.

The first stage planetary gears 110*a*, 110*b*, 110*c* and 110*d* are provided at equal radially spaced positions about the axis $A_1$-$A_1$ meshing with the input sun gear 54, so as to be engaged therewith. The gears 110 most preferably are made from carburizing grade steel which is machine heat treated and finish ground to precise tolerances. As shown best in FIG. 5, the first stage planet gears 110*a*, 110*b*, 110*c*, 110*d* have a diameter $d_1$ selected smaller than the radial spacing between the input sun gear 54 and the internal teeth 75 on the ring gear 74.

The compound planet gears 112*a*, 112*b*, 112*c*, 112*d* are axially elongated and include a first diameter pinion end 118 (FIG. 5) having a diameter $d_2$, and a second diameter pinion end 12 having a diameter (FIG. 6) which is larger than diameter $d_2$. The first diameter pinion end 118 which, for example, is shown best in FIG. 5, preferably has a number of radially extending gear teeth and diameter $d_2$ which is substantially equal to diameter $d_1$. The end portion 118 of each compound gear 112*a*, 112*b*, 112*c*, 112*d* is sized and positioned for interposed engagement both with an associated first stage planet gear 110*a*, 110*b*, 110*c*, 110*d*, as well as the internal toothed periphery 75 of the ring gear 74. As shown in FIG. 6, the second pinion end 120 of each of the second compound planet gears 112*a*, 112*b*, 112*c*, 112*d* has a radial diameter $d_3$ and number of peripheral gear teeth selected greater than that of the first pinion end 118. The second pinion ends 120 of the gears 112 are spaced axially outward from the ring gear 74 and matingly engage the output sun gear 56.

The ring gear 74 is provided with internal teeth 75 having a spacing (shown best in FIG. 5) which is configured for mated tooth engagement with the first diameter pinion end 118 of the second compound gears 112.

As shown best in FIGS. 2 and 3 a brake wheel 88 is coupled to the output sun gear 56 for rotation about the axis $A_1$-$A_1$ therewith. The peripheral surface of the brake wheel 88 is selectively engageable by means of a one-way sprag clutch assembly, or more preferably the peripherally disposed brake band 128*b* which is provided as part of brake band assembly 90. As will be described, in operation of the transmission assembly 22, the brake band assembly 90, may be used to lockup to engage the rotation of the output sun gear 56 relative to the housing 34 and planet gear carrier 80.

FIGS. 2 and 3 illustrate the hydraulic brake bands assemblies 84,90 used to selectively permit or prevent rotation of the ring gear 74 and brake wheel 88, respectively. Within the housing 34 are disposed a pair of hydraulic cylinders 124*a*, 124*b* which, most preferably, are in fluid communication with the oil pan 35 and oil pump housing 41. The hydraulic cylinders 124*a*, 124*b* are fabricated from suitable tubing and are welded or otherwise secured to the transmission housing 34. More preferably, the cylinders 124*a*, 124*b* are controlled by a small programmable logic controller (PLC) that outputs an electrical signal to servo valves (not shown). The servo valves in turn direct hydraulic oil or other fluids to individual actuator pistons 68,70 and/or brake cylinders 124*a*, 124, changing the ratio and/or speed direction of the rotating gears. A hydraulic actuator 126*a*, 126*b* such as a sliding piston, is provided within each hydraulic cylinder 124, 124*b*. The actuators 126*a*, 126*b* are in turn coupled to the brake bands 128*a*, 128*b*, respectively, which extend about and are engageable with a periphery of ring gear 74 and brake wheel 88, respectively. As such, the operation of the hydraulic cylinders 124*a*, 124*b* by the PLC are selectively operable to tension or release the brake bands 128*a*, 128*b* into bearing contact with either the ring gear 74 and or brake wheel 88 in the operation of the transmission assembly 22.

The operation of the transmission assembly 22 is shown best with reference to FIGS. 7 to 10. The transmission assembly 22 has three forward speeds with locked up converter, one reverse speed, and/or neutral operations. By selectively connecting specific clutch pack arrays 62,64 and/or engaging brake band assemblies 84,90 and disconnecting others sets, individual speeds and/or reverse or neutral operations may be achieved. Most preferably, the operation of the transmission assembly 22 is controlled by the selective actuation of the hydraulic actuators 126*a*, 126*b* within the respective cylinders 124*a*, 124*b* to activate and/or de-activate the brake bands 128*a*, 128*b*. The programmable logic controller (PLC) is provided to output an electrical signal to servo valves (not shown) used to direct hydraulic oil or other suitable fluids to flow from the pump housing 41 to the actuator pistons 68,70 and or desired cylinder 124*a*, 124*b*.

Figure 7:
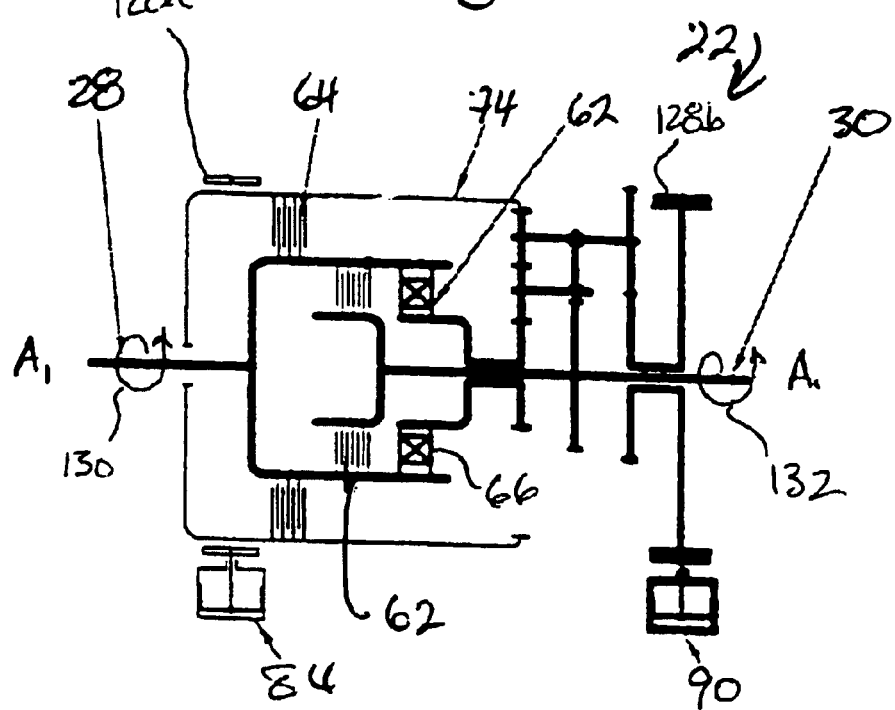
FIG. 7 illustrates schematically the transmission assembly shown in FIG. 2 illustrating the operation of the transmission drive shaft in a first forward gear.

FIG. 7 illustrates the transmission assembly 22 schematically, in a first operating gear with the primary drive belt 14 and torque converter 20 used to rotate the input drive shaft 28 forwardly in the direction of arrow 130 about the axis A-$A_1$. First gear is obtained by the activation of the one-way sprag assembly 66 rotating the input sun gear 54 together with the drive shaft 28. Concurrently, the band brake assembly 90 is set by its respective hydraulic actuator 126*b* to result in the engagement of brake band 128*b* with the brake wheels 88 and prevent rotation movement of the output sun gear 56 within the housing 34.

The clutch plate arrays 62,64 and remaining brake band assembly 84 are left open to permit relative free movement of the ring gear 74, relative to the input shaft 28. With this configuration, power is transmitted from the input shaft 28 to the one-way sprag clutch assembly 66 and input sun gear 54. As the output sun gear 56 is held in a stationary position, the first stage planet gears 110*a*, 110*b*, 110*c*, 110*d* are driven by the input sun gear 54, and in turn rotate the associated compound planet gears 112*a*, 112*b*, 112*c*, 112*d*. The rotation of the compound planet gears 112 causes the ring gear 74 to rotate freely, and the planet gears 112*a*, 112*b*, 112*c* to "walk" about the output sun gear 56. The rotational movement of the compound planet gears 112*a*–*d* imparts rotational movement to the planet gear carrier 80 which, as it is coupled directly to the output shaft 30, rotates the output shaft 30 in the direction of arrow 132 to drive the secondary drive belt 24.

Figure 8:
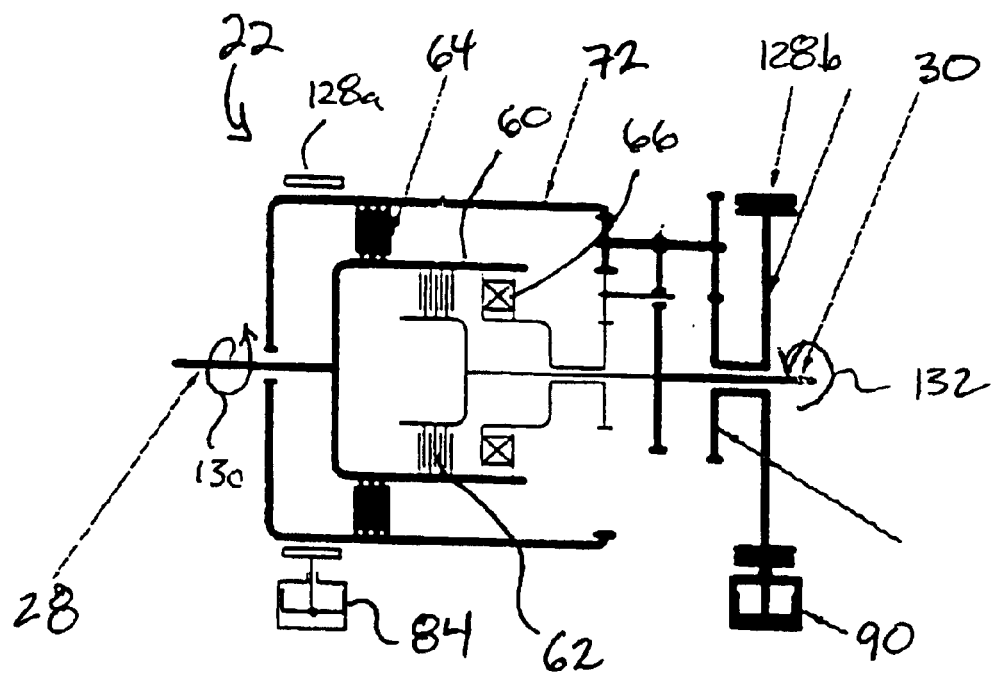
FIG. 8 illustrates schematically the transmission assembly shown in FIG. 2 illustrating the operation of the transmission drive shaft in a second forward gear.

Operation of the transmission assembly 22 in the second gear is shown best in FIG. 8, with the formal rotation of input shaft 28 in the direction of arrow 130, the second array of clutch plates 64 is engaged to lockup the ring gear 74 for rotation with forward drum clutch assembly 60. In second gear, the brake band assembly 90 remains deployed to prevent rotation of the brake wheel 88 and output sun gear 56 relative to housing 34. The brake band assembly 84 is also maintained in an inactive state. The clutch plate array 62 remains released to maintain the input drive shaft 28 in an uncoupled state from the output shaft 30. As with first gear, the band brake 128*b* continues to prevent rotation of the output sun gear 56 relative to the housing 34. In second gear, rotational power is transmitted by the input shaft 28 via the clutch drum 60 and clutch plate 64 to the ring gear 74. The rotation of the ring gear 74 with the input shaft 28 rotates the compound planet gears 112a, 112b, 112c, 112d at a higher rotational speed than the input sun gear 54, giving it a higher ratio. This in turn causes rotational movement of the compound gears 112 relative to the stationary output sun gear 56, and transmits power to the planet gear carrier 80, causing it to rotate at second increased speed about the stationary output sun gear 56, driving the output shaft 30 in the direction of arrow 132.

Figure 9:
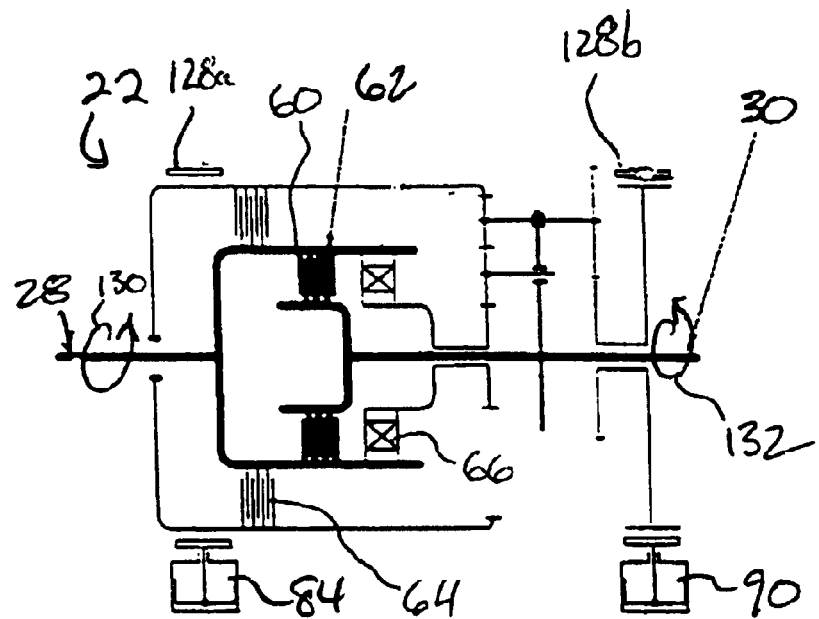
FIG. 9 illustrates schematically the transmission assembly shown in FIG. 2 illustrating the operation of the transmission drive shaft in a third forward gear.
Figure 10:
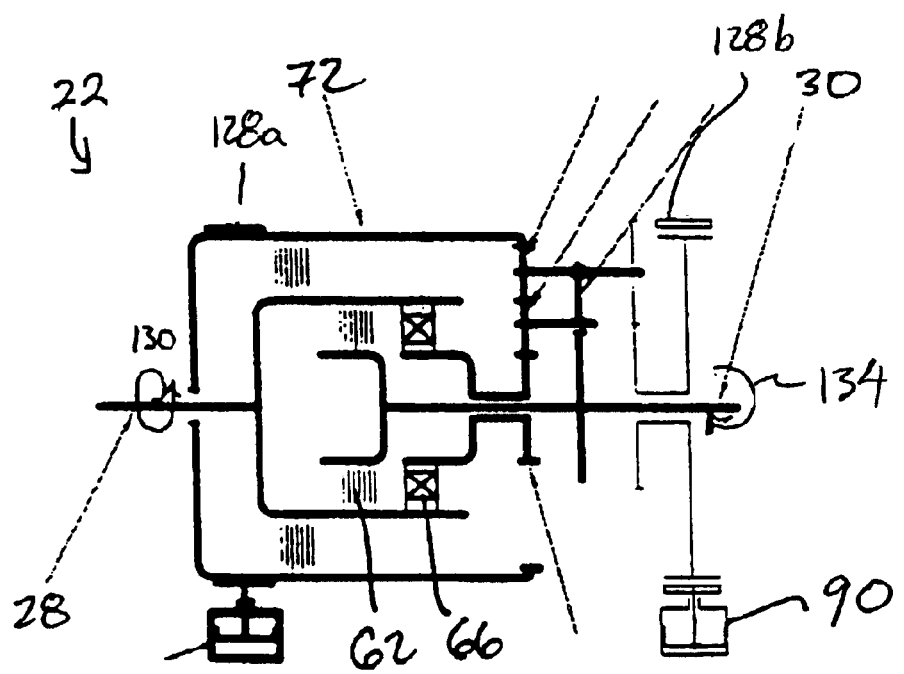
FIG. 10 illustrates schematically the transmission assembly shown in FIG. 2 illustrating the operation of the transmission drive shaft in a reverse gear.

The operation of the transmission assembly 22 in a third gear is illustrated best with reference to FIG. 9. In third gear, the inner clutch plate array 62 is engaged to couple the input drive shaft 28 and the forward clutch drum assembly 60 directly to the clutch hub 72 (FIG. 5) and output shaft 30. Simultaneously, the brake band 90 assembly is released so as to no longer lockup the output sun gear 56 by its engagement with the brake band 128b. The brake band assembly 84 remains deactivated to permit the rotation of ring gear 74 relative to the band brake 128a. Although not essential, the clutch pack array 64 most preferably is maintained in engaged state. In this position, each of the input drive shaft and output shaft 30 are locked together in rotation in the direction of arrows 130,132. The locking up of all of the shafts 28,30, thus, achieves direct drive from the input shaft 28 to the output shaft 30 with a 1:1 transmission ratio therebetween.

The transmission assembly 22 may be operated to rotate the output shaft 30 in a reverse orientation of arrow 134 for a reverse gear. Reverse gear is shown best in FIG. 10 as being achieved by engaging the ring gear brake band assembly 84 to cause the brake band 128a to engage the ring gear 74 and prevent its rotation within the housing 34. The brake band assembly 90 is simultaneously deactivated to release the brake band 128b and permit the output sun gear 56 to rotate freely about the axis $A_1$-$A_1$. The clutch plate arrays 62,64 are both deactivated. In this configuration, power is transmitted by the input shaft 28 in the direction of arrow 130, to the input sun gear 54 via the one-way sprag assembly 66. The rotation of the input sun gear 54 within the planet gears 110a–d and 112a–d causes their engaging rotation. The stationary ring gear 74 results in the movement of the planetary gears 110a, 110b, 110c, 110d in the reverse direction along the teeth 75. The reverse movement of the planetary gears 110a, 110b, 110c, 110d relative to the ring 74 rotates the planetary gear carrier 80 in the opposite direction, moving the output shaft 30 in the direction of arrow 134 therewith.

It is to be appreciated that to achieve a neutral position with the transmission assembly 22, both sets of clutch plate arrays 62,64 are deactivated, and both brake band assemblies 84,90 are released. In this configuration, the input shaft 28 and input sun gear 54 are permitted to rotate. This in turn permits free wheeling of the planetary gears 110a, 110b, 110c, 110d, 112a, 112b, 112c, 112d, uncoupling the output shaft 30 from the input shaft 28.

The automatic transmission assembly 22 of the present invention provides additional simplicity and comfort to vehicle operation. It is to be appreciated that the transmission assembly 22 overcomes the disadvantages of prior art by providing an improved compact transmission construction which is sufficiently compact, so as to be suitable for use on light vehicles with a traversly mounted engine and transmission.

Although the detailed description describes the transmission assembly 22 as being used in light vehicle and motorcycle applications, the invention is not so limited. The transmission assembly 22 is equally suitable for use in automotive applications with conventional V-6 and/or V-8 applications. Furthermore, the applicant has appreciated that the transmission assembly 22 may advantageously be used in racing applications, as for example in automobile off road or drag racing applications where input power may range between 500 and 2500 hp. In particular, the direct coupling of the input shaft 28 and output shaft 30 by the clutch plate array 62 in third gear, may advantageously permit the assembly 22 to continue to provide output drive power, even in the event of the failure of the ring gear 74 and/or planetary gear assembly 58.

While the detailed description discloses the transmission assembly as including a pair of brake band assemblies 88,90 the invention is not so limited. Those skilled in the art will appreciate that other types of clutch assemblies, including without restriction sprag clutch assemblies may be used in substitution for the brake band assemblies 88,90 described.

Although the detailed description describes and illustrates various preferred embodiments, the invention is not so limited. Many modifications and variations will now occur to persons skilled in the art. For a definition of the invention, reference may be had to the appended claims.

I claim:

1. A transmission comprising,
    an input drive shaft, the input drive shaft being elongated along and rotatable about an axis,
    an elongated output shaft, the output shaft being rotatable about and coaxial with the axis,
    an input sun gear being selectively rotatable about the axis,
    a one-way clutch coupled to the input shaft for rotation therewith and selectively engaging the input sun gear, the one-way clutch operable to rotate the input sun gear in forward rotation about the axis when the input drive shaft is rotated about the axis at a faster forward rate than the output drive shaft,
    an output sun gear spaced axially from the input sun gear, the output sun gear being selectively rotatable about the axis,
    an output gear brake assembly selectively operable to permit or prevent rotation of the output sun gear radially about the axis,
    a first clutch assembly including,
        a first clutch drum assembly including a first selectively actuable clutch piston coupled to the input shaft for rotation therewith, and
        a first clutch plate array activatable by said first clutch piston to couple the first drum assembly and said output drive shaft,
    a second clutch assembly including,
        an annular ring gear having an annularly extending toothed ring gear surface extending radially about and spaced from the axis,
        a second selectively actuable clutch piston coupled to the ring gear for rotation therewith, and
        a second clutch plate array activatable by said second clutch piston to coupled the ring gear to the first drum assembly for rotation therewith,
    a ring gear brake assembly selectively operable to permit or prevent rotation of the ring gear,
    a planetary gear assembly comprising,
        a planet gear carrier fixed to said output shaft for rotation therewith, a first set of planetary gears rotatably mounted on said planet gear carrier and meshing with a portion of said input sun gear, and a second set of compound planet gears rotatable mounted on said planet gear carrier, each second compound gear comprising, a first diameter portion and a second diameter portion spaced axially from the first diameter portion, the first diameter portion interposed between and meshing with an associated one of said first planetary gears and said toothed ring gear surface, the second diameter portion meshing with said output sun gear.

2. The transmission as claimed in claim 1, wherein the second diameter portion of each compound planetary gear has a diameter selected greater than a diameter of the first diameter portion.

3. The transmission as claimed in claim 2, wherein the input sun gear has a number of radially extending gear teeth selected less than that of the output sun gear.

4. The transmission as claimed in claim 3, wherein the input planetary gears have a number of radially extending gear teeth selected substantially equal to a number of radially extending gear teeth along the first diameter portion of the associated compound planetary gear.

5. The transmission as claimed in claim 1, further including a hydraulic fluid supply for selectively providing fluid to the first and second clutch pistons to activate a respective first and second clutch array.

6. The transmission as claimed in claim 1, further including a plurality of pin shafts, each pin shaft having a pin axis substantially aligned with said axis and rotatably mounting a respective one of said first planetary gears and said second compound gears to said planetary gear carrier for rotation about the pin axis.

7. The transmission as claimed in claim 1, wherein said first set of planetary gears comprises four planetary gears mounted to said planetary gear carrier at substantially equally radially spaced locations about said axis.

8. The transmission as claimed in claim 1, wherein the output sun gear is radially disposed about the output shaft.

9. The transmission as claimed in claim 8, wherein the output sun gear includes a radially extending brake drum, and the output gear brake assembly comprises a fluid activated brake band which is selectively movable into and out of engaging contact with the brake drum.

10. A light vehicle drive assembly comprising,
a vehicle engine having an engine output shaft,
a transmission comprising, a transmission housing having an opening extending axially therethrough, an elongated input drive shaft and output drive shaft being coaxially aligned in said opening, each of the input drive shaft and output drive shaft being elongated along and rotatable about the axis, a linkage rotatably coupling the engine output shaft and the input shaft, an input sun gear being selectively rotatable about the axis, a one-way clutch coupled to the input shaft for rotation therewith, the one-way clutch engaging and rotating the input sun gear in forward rotation about the axis only when the input drive shaft is rotated about the axis at a faster forward rate that the output drive shaft, an output sun gear disposed about the axis and being selectively rotatable about the axis, an output gear brake assembly selectively engageable with the output sun gear to permit or prevent rotation of the output sun gear relative to said housing, a first clutch assembly including, a first clutch drum assembly including a clutch drum coupled to the input shaft for rotation therewith, a first selectively actuable clutch piston mounted to said first clutch drum, and a first clutch plate array activatable by said first clutch piston to rotatably couple the first drum assembly and said output drive shaft, a second clutch assembly including, an annular ring gear having an annularly extending toothed ring gear surface extending radially about and spaced from the axis, a second selectively actuable clutch piston coupled to the ring gear for rotation therewith, and a second clutch plate array activatable by said second clutch piston to couple the ring gear to the first drum assembly for rotation therewith, a ring gear brake assembly selectively operable to permit or prevent rotation of the ring gear relative to said housing, a planetary gear assembly comprising, a first set of planetary gears rotatably mounted on said planet gear carrier and meshing with a portion of said input sun gear, and a second set of compound planet gears rotatably mounted on said planet gear carrier, each second compound gear comprising, a first diameter portion and a second diameter portion spaced axially from the first diameter portion, the first diameter portion interposed between and meshing with an associated one of said first planetary gears and said toothed ring gear surface, the scone diameter portion meshing with said output sun gear.

11. The drive assembly as claimed in claim 10, wherein the engine output shaft is rotatable about an output shaft axis parallel to the axis of elongation of the transmission input shaft.

12. The drive assembly as claimed in claim 10, wherein the second diameter portion of each compound planetary gear has a diameter selected greater than a diameter of the first diameter portion.

13. The drive assembly as claimed in claim 10, wherein the input sun gear has a number of radially extending gear teeth selected less than that of the output sun gear.

14. The drive assembly as claimed in claim 13 wherein the input planetary gears have a number of radially extending gear teeth selected substantially equal to a number of radially extending gear teeth along the first diameter portion of the associated compound planetary gear.

15. The drive assembly as claimed in claim 14, further including a hydraulic fluid supply for selectively providing a fluid to the first and second clutch pistons to activate a respective first and second clutch array.

16. a transmission comprising, a transmission housing having an elongated opening extending along an axis therethrough, an elongated input drive shaft rotatably disposed in said opening, an output drive shaft being coaxially aligned, an input sun gear disposed radially about the axis and being selectively rotatable, a one-way clutch coupled to the input shaft for rotation therewith, the one-way clutch engaging and rotating the input sun gear in forward rotation about the axis only when the input drive shaft is rotated about the axis at a faster forward rate than the output drive shaft, an output sun gear disposed radially about the output shaft and being selectively rotatable about the axis, an output gear brake assembly selectively engageable with the output sun gear to permit or prevent rotation of the output sun gear relative to said housing, a first clutch assembly including,
 a first clutch drum assembly including a clutch drum coupled to the input shaft for rotation therewith, a first selectively actuable clutch piston mounted to said first clutch drum assembly, a first clutch plate array activatable by said first clutch piston to rotatably coupled the first drum assembly and said output drive shaft, a second clutch assembly including,
 an annular ring gear having an annularly extending gear surface extending radially about and spaced from the axis, a second selectively actuable clutch piston coupled to the ring gear for rotation therewith, and a second clutch plate array activatable by said second clutch piston to couple the ring gear to the first clutch drum for rotation therewith, a ring gear brake assembly selectively operable to permit or prevent rotation of the ring gear relative to said housing, a planetary gear assembly comprising,
 a planet gear carrier fixed to said output shaft for rotation therewith,
 a first set of planetary gears rotatably mounted on said planet gear carrier and meshing with a portion of said input sun gear, and
 a second set of compound planet gears rotatably mounted on said planet gear carrier, each second compound gear comprising,
  a first diameter portion and a second diameter portion spaced axially from the first diameter portion, the first diameter portion interposed between and meshing with an associated one of said first planetary gears and said toothed ring gear surface, the second diameter portion meshing with said output sun gear.

17. The transmission as claimed in claim 16, wherein the one-way clutch comprises a sprag gear assembly.

18. The transmission as claimed in claim 17, wherein the second diameter portion of each compound planetary gear has a diameter selected greater than a diameter of the first diameter portion, and the input sun gear has a radial diameter selected less than a radial diameter of the output sun gear.

19. The transmission as claimed in claim 16, wherein the input planetary gears have a number of radially extending gear teeth selected substantially equal to a number of radially extending gear teeth along the first diameter portion of the associated compound planetary gear.

20. The transmission as claimed in claim 16, further including a plurality of pin shafts, each pin shaft having a pin axis substantially aligned with said axis and rotatably mounting a respective one of said first planetary gears and said second compound gears to said planetary gear carrier for rotation about the pin axis.

* * * * *